United States Patent
Marshall et al.

(10) Patent No.: US 6,390,937 B1
(45) Date of Patent: May 21, 2002

(54) METHOD FOR VERIFYING THE CONCENTRICITY OF A MULTIPLE-LAYER GOLF BALL

(75) Inventors: Gary G. Marshall, Soddy Daisy, TN (US); Pijush K. Dewanjee, Oceanside, CA (US)

(73) Assignee: Callaway Golf Company, Carlsbad, CA (US)

(*) Notice: Subject to any disclaimer, the term of this patent is extended or adjusted under 35 U.S.C. 154(b) by 0 days.

(21) Appl. No.: 09/495,586

(22) Filed: Feb. 1, 2000

Related U.S. Application Data

(63) Continuation-in-part of application No. 09/295,635, filed on Apr. 20, 1999, now Pat. No. 6,117,024.

(51) Int. Cl.$^7$ .......................... A63B 37/04; A63B 37/06
(52) U.S. Cl. .................. 473/374; 473/371; 473/373; 473/372
(58) Field of Search .................. 473/351, 356, 473/359, 361, 363, 364, 367, 368, 370, 371, 372, 373, 374, 376, 377

(56) References Cited

U.S. PATENT DOCUMENTS

| | | |
|---|---|---|
| 3,034,791 A | 5/1962 | Gallagher |
| 3,147,324 A | 9/1964 | Ward |
| 3,979,126 A | 9/1976 | Dusbiber |
| 3,989,568 A | 11/1976 | Isaac |
| 4,123,061 A | 10/1978 | Dusbiber |
| 4,248,432 A | 2/1981 | Hewttt et al. |
| 4,321,183 A | 3/1982 | Cox et al. |
| 4,349,657 A | 9/1982 | Holloway |
| 4,442,282 A | 4/1984 | Kolycheck |
| 4,870,142 A | 9/1989 | Czerwinski et al. |
| 5,006,297 A | 4/1991 | Brown et al. |
| 5,047,495 A | 9/1991 | Kolycheck |
| 5,159,053 A | 10/1992 | Kolycheck et al. |
| 5,334,673 A | 8/1994 | Wu |
| 5,368,304 A | 11/1994 | Sullivan et al. |
| 5,484,870 A | 1/1996 | Wu |
| 5,688,191 A | 11/1997 | Cavallaro et al. |
| 5,692,974 A | 12/1997 | Wu et al. |
| 5,703,193 A | 12/1997 | Rosenberg et al. |
| 5,803,831 A | 9/1998 | Sullivan et al. |
| 5,813,923 A | 9/1998 | Cavallaro et al. |
| 5,885,172 A | 3/1999 | Herbert et al. |
| 5,888,437 A | 3/1999 | Calabria et al. |
| 5,908,358 A | 6/1999 | Wu |
| 6,180,722 B1 * | 1/2001 | Dalton et al. ............ 525/193 |

FOREIGN PATENT DOCUMENTS

WO    PCT/US98/03334    2/1998

OTHER PUBLICATIONS

Juvinall, Robert C. et al., Fundamentals of Machine Component Design, 2$^{nd}$ Edition. New York: John Wiley & Sons, Inc., 1993, pp. 93–96.*

A. Singh, "p–Phenylene Diisocyanate Based Polyurehane Elastomers," Advances in Urethane Science and Technology vol. 13 (Eds. K. Frisch & D. Klempher, 1996).

B.S. Lombardo, et al., "Advances in PPDI Prepolymer Technology," Uniroyal Chemical Company, Inc., Middlebury, Connecticut 06749.

* cited by examiner

Primary Examiner—Paul T. Sewelt
Assistant Examiner—Alvin A. Hunter, Jr.
(74) Attorney, Agent, or Firm—Michael A. Catania

(57) ABSTRACT

A method for determining the concentricity of a golf ball having a barium or bismuth doped boundary layer or cover is disclosed herein. The method uses an X-ray imaging machine to determine the thickness of the cover at various locations to ensure concentricity of the golf ball. The boundary layer may be an ionomer blend doped with barium or bismuth in an amount of five to fifteen parts per hundred of the ionomer material, and the cover may be composed of a thermoset polyurethane material. Alternatively, the cover may be doped with barium or bismuth, and the boundary layer may be undoped.

19 Claims, 1 Drawing Sheet

METHOD FOR VERIFYING THE CONCENTRICITY OF A MULTIPLE-LAYER GOLF BALL

CROSS REFERENCES TO RELATED APPLICATIONS

This application is a continuation-in-part application of co-pending U.S. patent application Ser. No. 09/295,635, filed on Apr. 20, 1999 now U.S. Pat. No. 6,117,024, and hereby incorporated by reference in its entirety.

STATEMENT REGARDING FEDERALLY SPONSORED RESEARCH

Not Applicable

BACKGROUND OF THE INVENTION

1. Field of the Invention

The present invention relates to golf balls and golf ball cover and boundary layer materials. More specifically, the present invention relates to a method to verify the concentricity of a golf ball cover using X-ray imaging of barium doped boundary layer.

2. Description of the Related Art

Conventionally golf balls are made by molding a cover around a core. The core may be wound or solid. A wound core typically comprises elastic thread wound about a solid or liquid center. Unlike wound cores, solid cores do not include a wound elastic thread layer. Solid cores typically may comprise a single solid piece center or a solid center covered by one or more mantle or boundary layers of material.

The cover may be injection molded, compression molded, or cast over the core. Injection molding typically requires a mold having at least one pair of mold cavities, e.g., a first mold cavity and a second mold cavity, which mate to form a spherical recess. In addition, a mold may include more than one mold cavity pair.

In one exemplary injection molding process each mold cavity may also include retractable positioning pins to hold the core in the spherical center of the mold cavity pair. Once the core is positioned in the first mold cavity, the respective second mold cavity is mated to the first to close the mold. A cover material is then injected into the closed mold. The positioning pins are retracted while the cover material is flowable to allow the material to fill in any holes caused by the pins. When the material is at least partially cured, the covered core is removed from the mold.

As with injection molding, compression molds typically include multiple pairs of mold cavities, each pair comprising first and second mold cavities that mate to form a spherical recess. In one exemplary compression molding process, a cover material is pre-formed into half-shells, which are placed into a respective pair of compression mold cavities. The core is placed between the cover material half-shells and the mold is closed. The core and cover combination is then exposed to heat and pressure, which cause the cover half-shells to combine and form a full cover.

As with the above-referenced processes, a casting process also utilizes pairs of mold cavities. In a casting process, a cover material is introduced into a first mold cavity of each pair. Then, a core is held in position (e.g. by an overhanging vacuum or suction apparatus) to contact the cover material in what will be the spherical center of the mold cavity pair. Once the cover material is at least partially cured (e.g., a point where the core will not substantially move), the core is released, the cover material is introduced into a second mold cavity of each pair, and the mold is closed. The closed mold is then subjected to heat and pressure to cure the cover material thereby forming a cover on the core. With injection molding, compression molding, and casting, the molding cavities typically include a negative dimple pattern to impart a dimple pattern on the cover during the molding process.

Materials previously used as golf ball covers include balata (natural or synthetic), gutta-percha, ionomeric resins (e.g., DuPont's SURLYN®), and polyurethanes. Balata is the benchmark cover material with respect to sound (i.e. the sound made when the ball is hit by a golf club) and feel (i.e. the sensation imparted to the golfer when hitting the ball). Natural balata is derived from the Bully Gum tree, while synthetic balata is derived from a petroleum compound. Balata is expensive compared to other cover materials, and golf balls covered with balata tend to have poor durability (i.e. poor cut and shear resistance). Gutta percha is derived from the Malaysian sapodilla tree. A golf ball covered with gutta percha is considered to have a harsh sound and feel as compared to balata covered golf balls. Ionomeric resins, as compared to balata, are typically less expensive and tend to have good durability. However, golf balls having ionomeric resin covers typically have inferior sound and feel, especially as compared to balata covers. Polyurethane covered golf balls have greater durability and a better feel than ionomer covers, however, polyurethane is relatively expensive and requires greater skill during manufacturing of the golf ball.

No matter what material is used, one essential requirement for manufacturing a golf ball, is properly balancing the golf ball to prevent the golf ball from hooking or slicing when in flight after having been hit with a golf club. Further, a golf ball that is not balanced properly will roll out of alignment during putting. The necessity for a properly balanced golf ball is further complicated by multiple piece golf balls, especially golf balls that have a cast thermoset layer. Most thermoset layers are only centered during insertion of the core into the thermoset mixture in the cavity, and thus, the core may move during the casting process. Detection of uncentered golf balls is difficult, and often requires damage to the golf ball itself.

Baryte fillers and other barium containing components have been used in golf balls in the past. Brown, U.S. Pat. No. 2,259,060; Cox et al., U.S. Pat. No. 3,883,145; and Chikaraishi, U.S. Pat. No. 5,609,532, all disclose using barium sulfate, barytes, in the core as a filler for weighting purposes to enhance balancing. Yamada et al., U.S. Pat. No. 4,679,794; Sullivan, U.S. Pat. No. 4,884,814; and Yamada, U.S. Pat. No. 5,274,041, all disclose using barium sulfate as a pigment for use in a golf ball cover, in an amount varying from one to ten parts by weight of the resin. Further, Higuchi et al., U.S. Pat. No. 5,704,854, discloses using barium sulfate as a weight adjusting filler.

However, the prior art fails to disclose a use for determining the concentricity of a golf ball using barium sulfates.

BRIEF SUMMARY OF THE INVENTION

The present invention provides a method for determining the concentricity of a multiple piece golf ball without damaging the golf ball. The present invention is able to accomplish this by providing a golf ball with a doped boundary layer that is imaged in an X-ray machine to measure the concentricity of the boundary layer and cover relative to the core.

One aspect of the present invention is a method for verifying the concentricity of a golf ball cover. The method includes forming a boundary layer over a core. The boundary layer is composed of a polymer material doped with barium or bismuth. Then, a cover is formed over the doped boundary layer to create a covered golf ball. Next, the covered golf ball is placed within an X-ray imaging machine. Finally, the covered golf ball is irradiated within the X-ray imaging machine to image the doped boundary layer relative to the cover and the core to determine the thickness of the cover.

The method also includes rejecting covered golf balls that have an unacceptable cover thickness. The method also includes measuring the thickness of the cover at two or more locations to determine concentricity. The method also includes detecting the outer perimeter of doped boundary layer, detecting the outer perimeter of the cover, and measuring the thickness of the cover.

Another aspect of the present invention is a method for verifying the concentricity of a multiple piece golf ball. The method includes forming a boundary layer over a solid core comprising a polybutadiene material. The boundary layer includes an ionomer blend material doped with barium in an amount of five to fifteen parts per hundred of the ionomer blend material. The method also includes forming a thermoset polyurethane cover over the doped boundary layer to create a covered golf ball. Next, the covered golf ball is placed within an X-ray imaging machine. Finally, the covered golf ball is irradiated within the X-ray imaging machine to image the doped boundary layer relative to the cover and the core to determine the thickness of the cover.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

The present invention provides a novel method for determining the concentricity of a golf ball cover and boundary layer relative to a core without damaging the golf ball. The present invention utilizes an X-ray imaging machine to view the multiple piece golf ball which has its image enhanced due to the doping of the boundary layer with barium, bismuth, or a mixture thereof.

Golf balls of the present invention generally include a solid core, one or more boundary or mantle layers and a cover. In the preferred embodiment, the golf ball of the present invention includes a solid core, a boundary layer (preferably comprising a thermoplastic material), and a cover of polyurethane. Preferably all embodiments of the present invention include a cover made by casting the polyurethane cover over the core/boundary layer combination.

Figure 1:
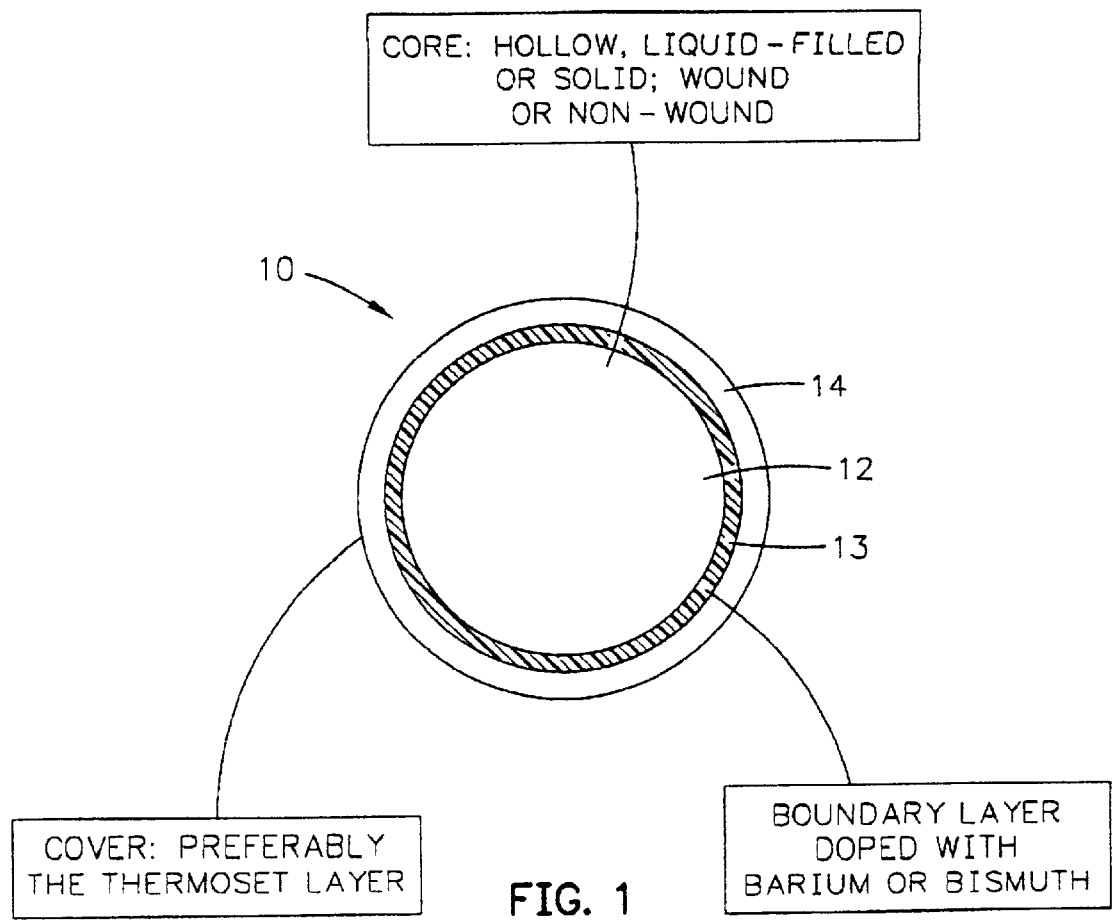
FIG. 1 illustrates a perspective view of a golf ball of the present invention including cut-away portion showing a core, a boundary layer, and a cover.

As is shown in FIG. 1, a first embodiment golf ball 10 comprises a ball 14 over an inner core 12 and a boundary layer 13. The boundary layer 13 may be a single layer, as shown, or multiple layers. In this embodiment, the inner core 12 is preferably compression molded to yield a single layer solid core, the boundary layer 13 is preferably injection molded over the core, and the ball 14 is preferably cast over the boundary layer 13 and core 12 (which, preferably, has been pre-heated).

The solid core 12 of the golf ball 10 is generally composed of a blend of a base rubber, a cross-linking agent, a free radical initiator, and one or more fillers or processing aids. A preferred base rubber is a polybutadiene having a cis-1,4 content of above about 90%, and more preferably 98% or above. Such materials are well known to those skilled in the art.

Alternatively, the core 12 may be a hollow-shell or liquid filled core. Yet further, the core 12 may have multiple layers of varying hardness. The core 12 preferably has a diameter in the range of 1.40 inches to 1.55 inches, and most preferably in the range of 1.48 inches to 1.52 inches. The diameter of the core 12 may be measured prior to placement of the boundary layer 13 thereon. Measuring the diameter of the core 12 prior to placement of the boundary layer 13 will ensure the accuracy of the subsequent measurements of the boundary layer 13 and the ball 14.

As is described above, the present invention preferably includes at least one boundary layer 13 that preferably is composed of a thermoplastic (e.g. thermoplastic or thermoplastic elastomer) or a blend of thermoplastics (e.g. metal containing, non-metal containing or both). However, the golf ball 10 may have several boundary layers 13 disposed between the core 12 and the ball 14. Most preferably the boundary layer 13 is composed of at least one thermoplastic that contains organic chain molecules and metal ions. The metal ion may be, for example, sodium, zinc, magnesium, lithium, potassium, cesium, or any polar metal ion that serves as a reversible cross-linking site and results in high levels of resilience and impact resistance. Suitable commercially available thermoplastics are ionomers based on ethylene copolymers and containing carboxylic acid groups with metal ions such as described above. The acid levels in such suitable ionomers may be neutralized to control resiliency, impact resistance and other like properties. In addition, other fillers with ionomer carriers may be used to modify (e.g. preferably increase) the specific gravity of the thermoplastic blend to control the moment of inertia and other like properties. Exemplary commercially available thermoplastic materials suitable for use in a boundary layer 13 of a golf ball 10 of the present invention include, for example, the following materials and/or blends of the following materials: HYTREL® and/or HYLENE® products from DuPont, Wilmington, Del., PEBEX® products from Elf Atochem, Philadelphia, Pa., SURLYN® products from DuPont, and/or ESCOR® or IOTEK® products from Exxon Chemical, Houston, Tex.

The Shore D hardness of the boundary layer 13 should be about 65 or less. It is preferred that the boundary layer 13 have a hardness of between about 50–65 Shore D. In a preferred embodiment, the boundary layer 13 has a Shore D hardness in the range of about 52–65. One reason for preferring a boundary layer 13 with a Shore D hardness of 65 or lower is to improve the feel of the resultant golf ball. It is also preferred that the boundary layer 13 is composed of a blend of SURLYN® ionomer resins. Table 3 below sets forth physical data for suitable boundary layers 13 that were manufactured and incorporated into specific embodiments of golf balls 10 of the present invention. As is shown in Table 3 below, a boundary layer 13 with a lower Shore D hardness tends to have a lower flexural modulus as well.

TABLE 3

Boundary Layer Properties

| Ball Ex. No. | SURLYN® % 8150 | SURLYN® % 9150 | SURLYN® % 6320 | Barytes (phr) | Thickness (inches) | FlexMod (psi) | Shore D Hardness |
|---|---|---|---|---|---|---|---|
| 1 | 40 | 40 | 20 | 8 | 0.065 | 55100 | 58 |
| 2 | 50 | 50 | 0 | 9 | 0.050 | 78600 | 61 |
| 3 | 50 | 50 | 0 | 9 | 0.050 | 78600 | 61 |
| 4 | 50 | 50 | 0 | 9 | 0.050 | 78600 | 61 |
| 5 | 32 | 32 | 36 | 9 | 0.058 | 41400 | 55 |
| 6 | 37.5 | 37.5 | 25 | 9 | 0.058 | 51200 | 57 |
| 7 | 40 | 40 | 20 | 9 | 0.058 | 55100 | 58 |
| 8 | 50 | 50 | 0 | 9 | 0.055 | 78600 | 61 |
| 9 | 47.5 | 47.5 | 5 | 9 | 0.050 | 71300 | 61 |

SURLYN® 8150, 9150, and 6320 are, respectively, an ionomer resin composed of a sodium neutralized ethylene/methacrylic acid, an ionomer resin composed of a zinc neutralized ethylene/methacrylic acid, and an ionomer resin composed of a terpolymer of ethylene, methacrylic acid and n-butyl acrylate partially neutralized with magnesium, all of which are all available from DuPont, Polymer Products, Wilmington, Del.

As is indicated in Table 3, all of the boundary layers 13 in the examples include a predetermined amount of a baryte mixture that includes a predetermined amount of barium. The baryte mixture is included as 5 or 10 parts per hundred parts of the ionomer resins, preferably 8 to 9 parts per hundred of the ionomer resin material. One preferred baryte mixture is composed of 80% barytes and 20% of an ionomer, and is available from Americhem, Inc., Cuyahoga Falls, Ohio, under the trade designation 38534X1. The specific gravity for each of the boundary layers 13 in Table 3 was 1.007. The flexural modulus provided in Table 3 was determined according to ASTM D790. The Shore D hardness provided in Table 3 was determined according to ASTM D2240.

The boundary layer 13 is preferably injection molded over the core 12 in a conventional injection molding machine. The core 12 is centered using retractable pins within the injection molding cavity. The cavity is filled with the thermoplastic material, and then the pins are retracted, allowing the thermoplastic material to fill the voids left by the pins. This allows for greater certainty in the centering of the core during formation of the boundary layer 13 thereon.

In the preferred embodiment, the ball 14 of the golf ball 10 of the present invention is preferably a castable thermoset polyurethane elastomer. A preferred polyurethane utilized in the present invention is composed of a PPDI-based prepolymer reacted with a curing agent. The PPDI-based prepolymer is formed from PPDI and a polyol such as an ester polyol, a polyether polyol, or a blend thereof. A preferred polyol is polycaprolactone. The curing agent, or curative, is a diol (e.g., 1,4 butane diol, trimethylpropanol), a mixture of diols (e.g., 1,4 butane diol and ethylene glycol, or other suitable glycols), a hydroquinone, a mixture of hydroquinones, a triol, a mixture of triols, a diamine, a mixture of diamines, an oligomeric diamine, a triamine, or a blend of some or all of these materials. Specifically, the ball 14 of the golf ball 10 of the present invention is most preferably composed of a polyurethane formed from a PPDI-based prepolymer and cured with a mixture of diols, such as, for example, a blend of 1,4 butane diol and glycols.

Although the golf ball cover 14 of the present invention is preferably manufactured in a casting process, the cover material may alternatively be provided as a thermoplastic polyurethane for injection molding of the ball 14 over the boundary layer 13 and core 12. The resulting product is modified using conventional procedures to form a desired thermoplastic material for injection molding of the ball 14 over the boundary layer 13 and core 12.

The ball 14 of the present invention preferably has a thickness of between about 0.02–0.09 inches, or more preferably between about 0.02–0.065 inches, and most preferably between about 0.02–0.04 inches.

The diameter of the core 12 and the thickness of the boundary layer 13 and ball 14 of the present invention are dependent on the desired diameter of the golf ball 10. The inner core 12 preferably has a diameter in the range of about 1.35 to 1.70 inches and the boundary layer 13 preferably has a wall thickness in the range of about 0.02 to 0.09 inches. If the desired diameter of the golf ball 10 is about 1.68 inches, then more preferably the core 12 has a diameter in the range of about 1.40 to 1.65 inches and the boundary layer 13 has a wall thickness in the range of about 0.02 to 0.075 inches, and most preferably the core 12 has a diameter in the range of about 1.45 to 1.60 inches and the boundary layer 13 has a wall thickness in the range of about 0.02 to 0.067 inches. If the desired diameter of the golf ball 10 is about 1.8 inches, then more preferably the core 12 has a diameter in the range of about 1.55 to 1.72 inches and the boundary layer 13 has a wall thickness in the range of about 0.02 to 0.09 inches, and most preferably the core 12 has a diameter in the range of about 1.6 to 1.72 inches and the boundary layer 13 has a wall thickness in the range of about 0.02 to 0.06 inches.

In manufacturing the golf ball 10 of the present invention, the boundary layer 13 is preferably injection molded about the inner core 12 in a conventional manner, resulting in a golf ball precursor product composed of a combination of an inner core 12 and a boundary 13. Depending on the desired diameter of the golf ball 10, the inner core 12 and the boundary layer 13 combination preferably has an overall diameter in the range of about 1.46 to 1.76 inches. If the desired diameter of the golf ball 10 is about 1.68 inches, then the core 12 and boundary layer 13 combination more preferably has an overall diameter in the range of about 1.55 to 1.64 inches, and most preferably in the range of about 1.6 to 1.64 inches. If the desired diameter of the golf ball 10 is about 1.8 inches, then the core 12 and boundary layer 13 combination more preferably has an overall diameter in the range of about 1.64 to 1.67 inches, and most preferably in the range of about 1.72 to 1.76 inches.

In the preferred manufacturing process, the polyurethane cover material is preferably introduced into a first mold cavity of a mold cavity pair at T0. About 30–90 seconds later (i.e. T0+30–90 seconds or T1) the golf ball precursor product (a core 12 and a boundary layer 13), is then held (e.g. via suction equipment) contacting the cover material in the first mold cavity in what will be the spherical center of the mold cavity pair. The cover material is allowed to at least partially cure (typically between about 10–30 seconds, i.e., until about T1+10–30 seconds, i.e. T2), and then the golf ball precursor product is released. Concurrently, the cover material is preferably introduced into a second cavity of the mold cavity pair at a time which enables it to set for about 30–90 seconds prior to T2, and then the mold is closed (thereby mating the first mold cavity to the second mold cavity), and subjected to heat and pressure to cure the cover material for about 2–10 minutes at about 140–220° F. and a pressure of about ⅓–2 ton per cavity in the mold thereby forming a cover 14 on the golf ball precursor product. The covered balls are then removed from the mold, allowed to cool and post-cure.

Figure 2:
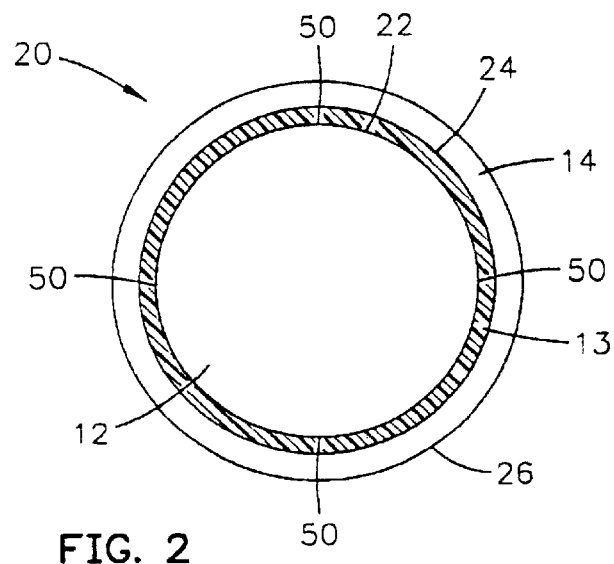
FIG. 2 illustrates an X-ray image of a golf ball of the present invention as viewed on an X-ray imaging machine.

After removal from the mold, each golf ball 10 is transported to an X-ray imaging machine 20, as shown in FIG. 2. The barium or bismuth doped boundary layer 13 enhances the image of the golf ball 10 on the screen allowing for the boundary layer 13 to be distinguished from the ball 14. Thus, the inner perimeter 22 and the outer perimeter 24 of the boundary layer 13 are detected to determine the thickness of the boundary layer 13. Further, the outer perimeter 26 of the ball 14 is detected, and this measurement is subtracted from the outer perimeter 24 measurement of the boundary layer 13 to give the thickness of the ball 14. The measurements are taken at different interval points, indicated by lines 50 on the golf ball to determine if the boundary layer 13 and the ball 14 are within design parameters of concentricity about the core 12. In a preferred embodiment, eight intervals are measured, and over one hundred measurements are taken at each interval. The information is compiled by a processing system of the X-ray imaging machine 20, and the golf ball is grouped as acceptable or not. If the golf ball 10 is not within design concentricities, then the golf ball 10 is rejected and dispensed from the X-ray machine 20 through a rejection chute for recovery of the materials. If the golf ball 10 is satisfactory in terms of concentricity, then it is sent for finishing thereof.

For example, the ball 14 is measured at various points to determine if the thickness is substantially equal at each point. One preferred acceptable variation in thickness is 0.003 inches. That is, the thickness of the ball 14 does vary more than 0.003 inches at any of the points 30–33. Thus, the ball 14 is within an acceptable design parameter for concentricity if the thickness at point 30 is 0.025 inches, the thickness at point 31 is 0.024 inches, the thickness at point 32 is 0.023 and the thickness at point 33 is 0.025. Alternatively, the cover 14 is not within an acceptable design parameter for concentricity if the thickness at point 30 is 0.025 inches, the thickness at point 31 is 0.024 inches, the thickness at point 32 is 0.023 and the thickness at point 33 is 0.028. This latter example would indicate that the core 12 was not centered properly, and thus the golf ball 10 would not be balanced and would perform unacceptably for its intended purpose. Those skilled within the pertinent art will recognize that the design parameters for concentricity may be set to variations that are higher or lower than 0.003 inches without departing from the scope and spirit of the present invention.

Alternatively, the ball 14 may contain the barium or bismuth material to be used to determine concentricity. In this embodiment, the boundary layer 13 may be composed of a thermoset material such as polyurethane, and the ball 14 may be composed of an ionomer material. Such a golf ball is disclosed in co-pending U.S. patent application Ser. No. 09/361,695, filed on Jul. 27, 1999, entitled Multi-Layer Golf Ball, which pertinent parts are hereby incorporated by reference. Thus, the same method may be used to distinguish a barium or bismuth doped ball 14 from an undoped boundary layer 13.

While embodiments of the present invention have been shown and described, various modifications may be made without departing from the scope of the present invention, and all such modifications and equivalents are intended to be covered. For example, the size and thickness ranges given are primarily directed to a ball having a finished diameter of about 1.68 inches which would thereby comply with current regulations of the United States Golf Association. However, balls of different sizes are considered to be included within the scope of the present invention.

We claim as our invention the following:

1. A method for verifying the concentricity of a golf ball cover, the method comprising:

forming a boundary layer over a core, the boundary layer comprising a polymer material doped with barium or bismuth;

forming a cover over the doped boundary layer to create a covered golf ball;

placing the covered golf ball in an X-ray imaging machine;

taking at least eight interval measurements of the covered golf ball within the X-ray imaging machine to image the doped boundary layer relative to the cover and the core and compiling these interval measurements in a processor to determine whether the boundary layer and the cover are concentric about the core.

2. The method according to claim 1 further comprising rejecting and recovering for materials golf balls that have an unacceptable cover thickness.

3. The method according to claim 1 further comprising measuring the thickness of the cover at at least two locations to determine concentricity.

4. The method according to claim 1 further comprising detecting the outer perimeter of doped boundary layer, detecting the outer perimeter of the cover, and measuring the thickness of the cover.

5. The method according to claim 1 further comprising detecting the inner perimeter of the doped boundary layer to fix the position of the core, detecting the outer perimeter of the doped boundary layer to fix the position of the cover, and determining the concentricity of the cover and doped-boundary layer relative to the core.

6. The method according to claim 1 wherein the boundary layer is an ionomer blend doped with barium in an amount of at least five parts per hundred of the ionomer blend material.

7. The method according to claim 1 wherein the boundary layer is an ionomer blend doped with barium in an amount of five to fifteen parts per hundred of the ionomer blend material.

8. The method according to claim 1 wherein the cover is a thermoset material.

9. The method according to claim 8 wherein the cover is a polyurethane thermoset material.

10. The method according to claim 1 wherein the cover has a thickness in the range of 0.020 inch to 0.05 inch.

11. The method according to claim 1 wherein the core has a diameter in the range of 1.40 inches to 1.55 inches, and the overall diameter of the finished golf ball is approximately 1.68 inches.

12. The method according to claim 2 wherein an acceptable thickness of the cover has a variance of no more then 0.003 inch.

13. The method according to claim 1 wherein the core is solid and comprises a polybutadiene material.

14. A method for verifying the concentricity of a multiple piece golf ball, the method comprising:

forming a boundary layer over a solid core comprising a polybutadiene material, the boundary layer comprising an ionomer blend material doped with barium in an amount of five to fifteen parts per hundred of the ionomer blend material;

forming a thermoset polyurethane cover over the doped boundary layer to create a covered golf ball;

placing the covered golf ball in an X-ray imaging machine; and taking at least eight interval measurements of the covered golf ball within the X-ray imaging machine to image the doped boundary layer relative to the cover and the core and compiling these interval measurements in a processor to insure the thickness of the cover varies no more than 0.003 inch.

15. The method according to claim 14 further comprising measuring the thickness of the cover at at least two locations to determine concentricity.

16. The method according to claim 14 further comprising detecting the outer perimeter of doped boundary layer, detecting the outer perimeter of the cover, and measuring the thickness of the cover.

17. The method according to claim 14 further comprising detecting the inner perimeter of the doped boundary layer to fix the position of the core, detecting the outer perimeter of the doped boundary layer to fix the position of the cover, and determining the concentricity of the cover and doped-boundary layer relative to the core.

18. The method according to claim 14 wherein the core has a diameter in the range of 1.40 inches to 1.55 inches, and the overall diameter of the finished golf ball is approximately 1.68 inches.

19. A method for verifying the concentricity of a multiple piece golf ball, the method comprising:

forming a boundary layer over a solid core;

forming a cover over the boundary layer to create a covered golf ball, the cover comprising a material doped with barium or bismuth in an amount of five to fifteen parts per hundred of the material;

placing the covered golf ball within an X-ray image machine; and taking at least one interval measurement of the covered golf ball within the X-ray imaging machine to image the doped cover relative to the boundary layer and the core and compiling these interval measurements in a processor to determine the thickness of the cover, and the concentricity of the golf ball.

* * * * *